US012512225B2

(12) United States Patent
Uchida

(10) Patent No.: US 12,512,225 B2
(45) Date of Patent: Dec. 30, 2025

(54) RISK DISPLAY APPARATUS, RISK DISPLAY METHOD, AND NON-TRANSITORY COMPUTER READABLE MEDIUM

(71) Applicant: NEC Corporation, Tokyo (JP)

(72) Inventor: Terutaka Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 18/267,148

(22) PCT Filed: Nov. 15, 2021

(86) PCT No.: PCT/JP2021/041851
§ 371 (c)(1),
(2) Date: Jun. 14, 2023

(87) PCT Pub. No.: WO2022/137884
PCT Pub. Date: Jun. 30, 2022

(65) Prior Publication Data
US 2024/0047073 A1 Feb. 8, 2024

(30) Foreign Application Priority Data
Dec. 22, 2020 (JP) .................................. 2020-212393

(51) Int. Cl.
G16H 50/30 (2018.01)
A61B 5/01 (2006.01)
(Continued)

(52) U.S. Cl.
CPC ............... G16H 50/30 (2018.01); A61B 5/01 (2013.01); G06T 7/70 (2017.01); G06V 10/761 (2022.01);
(Continued)

(58) Field of Classification Search
None
See application file for complete search history.

(56) References Cited

U.S. PATENT DOCUMENTS 8,924,319 B1    12/2014  Bearman
2012/0313964 A1*  12/2012  Sato ...................... G06V 20/30
                                                        345/619

(Continued)

FOREIGN PATENT DOCUMENTS

JP    2013-003635 A    1/2013
JP    2016-184196 A    10/2016
(Continued)

OTHER PUBLICATIONS

Perez et al. ("An agent-based approach for modeling dynamics of contagious disease spread." International journal of health geographics 8 (2009): 1-17) (Year: 2009).*
(Continued)

Primary Examiner — Christopher B Tokarczyk
(74) Attorney, Agent, or Firm — Sughrue Mion, PLLC

(57) ABSTRACT

A risk display apparatus includes at least one memory storing instructions, and at least one processor. The at least one processor is configured to execute the instructions to acquire image data from a camera, identify a plurality of persons from the image data, measure a distance between the persons, set an appearance of a connection line corresponding to each of the distances, generate a person icon indicating the person based on the image data, generate a risk image in which a plurality of the person icons are connected to each other through the connection lines, output risk image data of the risk image.

17 Claims, 12 Drawing Sheets

(51) Int. Cl.
*G06T 7/70* (2017.01)
*G06V 10/74* (2022.01)
(52) U.S. Cl.
CPC ............... *G06T 2207/30201* (2013.01); *G06V 2201/07* (2022.01)

(56) References Cited

U.S. PATENT DOCUMENTS

| | | | | |
|---|---|---|---|---|
| 2021/0313075 | A1* | 10/2021 | Mc Namara | G08B 21/182 |
| 2021/0390807 | A1* | 12/2021 | Chaurasia | G07C 9/27 |
| 2022/0031161 | A1* | 2/2022 | Marathe | A61B 5/0008 |

FOREIGN PATENT DOCUMENTS

| | | | |
|---|---|---|---|
| JP | 2017-207877 | A | 11/2017 |
| JP | 2018-169938 | A | 11/2018 |
| JP | 2020-091622 | A | 6/2020 |
| WO | 2019/239813 | A1 | 12/2019 |

OTHER PUBLICATIONS

International Search Report for PCT Application No. PCT/JP2021/041851, mailed on Feb. 8, 2022.

* cited by examiner

RISK DISPLAY APPARATUS, RISK DISPLAY METHOD, AND NON-TRANSITORY COMPUTER READABLE MEDIUM

This application is a National Stage Entry of PCT/JP2021/041851 filed on Nov. 15, 2021, which claims priority from Japanese Patent Application 2020-212393 filed on Dec. 22, 2020, the contents of all of which are incorporated herein by reference, in their entirety.

TECHNICAL FIELD

The present invention relates to a risk display apparatus, a risk display method, and a non-transitory computer readable medium.

BACKGROUND ART

Various techniques for knowing, when there is contact among a plurality of persons, the risk of each of these persons being infected with an infectious disease have been proposed.

For example, Patent Literature 1 discloses a technique for specifying a gazing region indicating a region at which each of a plurality of object persons who may be in a predetermined area and belong to a group gazes, and estimating the group based on the specified gazing region of each of the plurality of object persons.

Patent Literature 2 discloses a technique for specifying a strength of a relationship related to infection between rooms based on infection information about persons and information about movement of persons between rooms, and displaying, on a map, information indicating the specified strength of a relationship related to infection between rooms, and the like.

Patent Literature 3 discloses a technique for displaying an infection influence range in a medical treatment facility based on a movement route of a person obtained from round information and a degree of risk of the person being infected.

CITATION LIST

Patent Literature

Patent Literature 1: Japanese Unexamined Patent Application Publication No. 2020-091622
Patent Literature 2: Japanese Unexamined Patent Application Publication No. 2018-169938
Patent Literature 3: Japanese Unexamined Patent Application Publication No. 2016-184196

SUMMARY OF INVENTION

Technical Problem

In the techniques described above, a relationship among persons and the risk of infection according to a predetermined rule are displayed. However, when the actual risk of infection that occurs is determined, it is difficult to do so only quantitatively, and thus it is often not possible to appropriately determine the aforementioned actual risk of infection by the above-described features.

The present disclosure has been made in view of the above-described problem and an object thereof is to provide a risk display apparatus and the like that are capable of collectively displaying multiple risks of infections that occur.

Solution to Problem

A risk display apparatus according to an example embodiment of the present disclosure includes image data acquisition means, person identification means, measurement means, connection line setting means, person icon generation means, image generation means, and output means. The image data acquisition means acquires image data from a camera. The person identification means identifies a plurality of persons from the image data. The measurement means measures a distance between the persons. The connection line setting means sets an appearance of a connection line corresponding to each of the distances. The person icon generation means generates a person icon indicating the person based on the image data. The image generation means generates a risk image in which a plurality of the person icons are connected to each other through the connection lines. The output means outputs risk image data of the risk image.

In a risk display method according to an example embodiment of the present disclosure, a computer executes the following method. The computer acquires image data from a camera. The computer identifies a plurality of persons from the image data. The computer measures a distance between the persons. The computer sets an appearance of a connection line corresponding to each of the distances. The computer generates a person icon indicating the person based on the image data. The computer generates a risk image in which a plurality of the person icons are connected to each other through the connection lines. The computer outputs risk image data of the risk image.

A program according to an example embodiment of the present disclosure causes a computer to execute the following steps. The computer acquires image data from a camera. The computer identifies a plurality of persons from the image data. The computer measures a distance between the persons. The computer sets an appearance of a connection line corresponding to each of the distances. The computer generates a person icon indicating the person based on the image data. The computer generates a risk image in which a plurality of the person icons are connected to each other through the connection lines. The computer outputs risk image data of the risk image.

Advantageous Effects of Invention

According to the present disclosure, it is possible to provide a risk display apparatus and the like that are capable of collectively displaying multiple risks of infections that occur.

EXAMPLE EMBODIMENT

Figure 1:
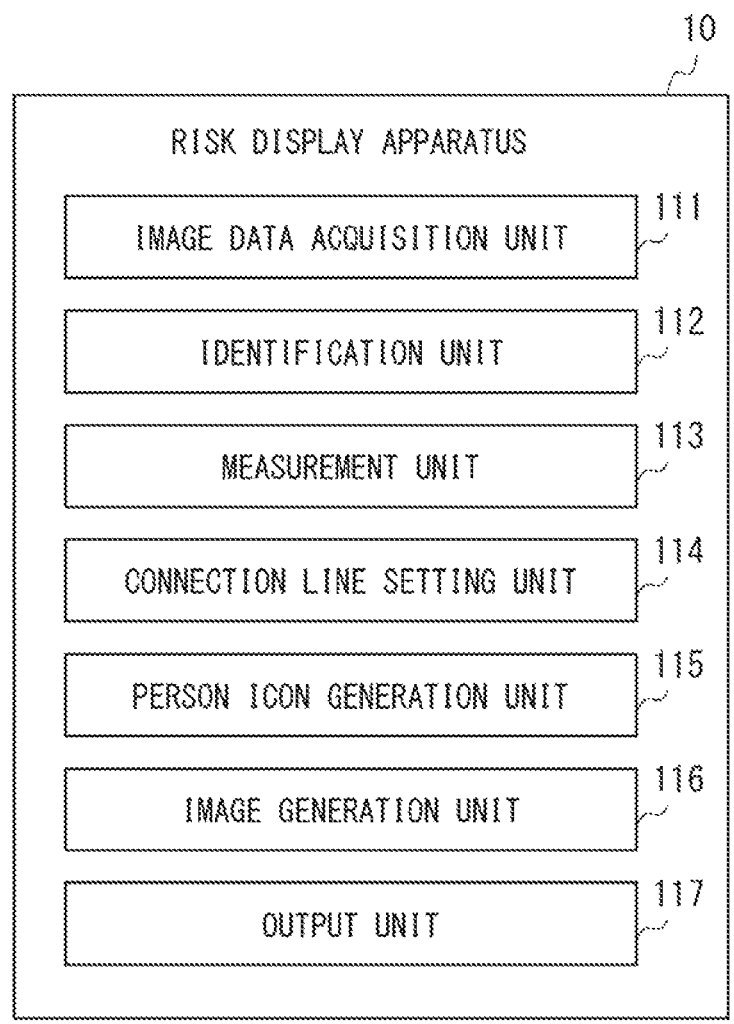
FIG. 1 is a block diagram of a risk display apparatus according to a first example embodiment.

The present invention will be described hereinafter through example embodiments of the present invention. However, the following example embodiments are not intended to limit the scope of the invention according to the claims. Further, all the components described in the example embodiments are not necessarily indispensable as means for solving the problem. For the clarification of the description, the following descriptions and the drawings are partially omitted and simplified as appropriate. Note that the same elements are denoted by the same reference numerals or symbols throughout the drawings, and redundant descriptions are omitted as necessary.

First Example Embodiment

Example embodiments of the present invention will be described below with reference to the drawings. FIG. 1 is a block diagram of a risk display apparatus 10 according to a first example embodiment. The risk display apparatus 10 is an apparatus for displaying, based on, for example, a contact state between a plurality of persons present in a predetermined facility, the risk of each of these persons being infected with an infectious disease. The risk display apparatus 10 is connected to a camera that captures scenery in the facility so that it can communicate with the camera. The risk display apparatus 10 is also connected to a predetermined display apparatus that displays risk images so that it can communicate with the display apparatus. The risk display apparatus 10 mainly includes an image data acquisition unit 111, an identification unit 112, a measurement unit 113, a connection line setting unit 114, a person icon generation unit 115, an image generation unit 116, and an output unit 117. Note that these components included in the risk display apparatus 10 are connected to each other so that they can communicate with each other as appropriate.

The image data acquisition unit 111 acquires image data generated at a plurality of different times by a camera installed so as to capture scenery in the predetermined facility. For example, the camera generates image data of about 15, 30, or 60 frames per second, and the image data acquisition unit 111 acquires the image data generated by the camera at each 1/15, 1/30, or 1/60 second. For example, one or a plurality of cameras may be connected to the image data acquisition unit 111. Further, the camera to which the image data acquisition unit 111 is connected may be fixed in order to capture a predetermined angle of view, or may be a movable camera that pans, tilts, or zooms. The image data acquisition unit 111 supplies image data acquired from the camera to each of the components as appropriate.

The identification unit 112 receives the image data acquired by the image data acquisition unit 111 and detects an image of a person (a person image) included in the received image data, thereby identifying the person. For example, the identification unit 112 performs convolution processing on the image data, thereby retrieving a region having a feature value that matches the feature value of the person image. Then the identification unit 112 determines that the region that matches the feature value of the person image is a person image. When a plurality of persons are included in an image of image data, the identification unit 112 identifies each of the plurality of persons included in the image. The identification unit 112 supplies information about the identified persons to the measurement unit 113. The information about the identified persons includes, for example, position information of the persons in the image.

The measurement unit 113 acquires image data from the image data acquisition unit 111, acquires information about persons from the identification unit 112, and then measures a distance between the persons. Thus, the measurement unit 113 holds information about the measured distance regarding each of a plurality of the persons. The measurement unit 113 supplies information about the identified person and information about the distance measured with regard to this person to the connection line setting unit 114.

The connection line setting unit 114 sets an appearance of a connection line based on the information about the distance received from the measurement unit 113. The connection line according to this example embodiment is a symbol for indicating a distance between two persons. The connection line setting unit 114 sets an appearance of the connection line in such a form that a user can know a distance between persons included in the image data by visually recognizing the appearance of the connection line. Examples of the appearance of the connection line include one of a length, thickness, color tone, and line style of the connection line.

More specifically, the connection line setting unit 114 may indicate, for example, a distance between persons by the length of the connection line. However, the appearance of the connection line set by the connection line setting unit 114 is not limited to the above-described specific example. When the connection line setting unit 114 sets the appearance of the connection line, the connection line setting unit 114 supplies information related to this setting to the image generation unit 116.

The person icon generation unit 115 generates a person icon indicating a person using the image data received from the image data acquisition unit 111. For example, the person icon generation unit 115 extracts an image of the identified person and generates a person icon using the extracted image. The person image extracted by the connection line setting unit 114 is, for example, an image of the face (a face image) of a person. Note that the person icon may include character data. The person icon generation unit 115 supplies information about the generated person icon to the image generation unit 116.

The image generation unit 116 receives information about the appearance of the connection line from the connection line setting unit 114 and information about the person icon from the person icon generation unit 115. Then the image generation unit 116 generates a risk image from these received pieces of information. The image generation unit 116 supplies the generated risk image to the output unit 117.

The risk image is an image in which a plurality of person icons are connected to each other through connection lines. More specifically, the risk image is an image in which two person icons are connected to each other by a predetermined connection line. That is, in the risk image, a person icon represents the person captured, and a connection line connecting the person icons to each other represents a relationship between persons related to the two person icons connected by the connection line. By displaying the risk image, the risk display apparatus 10 shows the contact state between persons to a user who visually recognizes the risk image.

The output unit 117 receives the risk image data from the image generation unit 116 and outputs the received risk image data to the display apparatus connected to the risk display apparatus 10.

Figure 2:
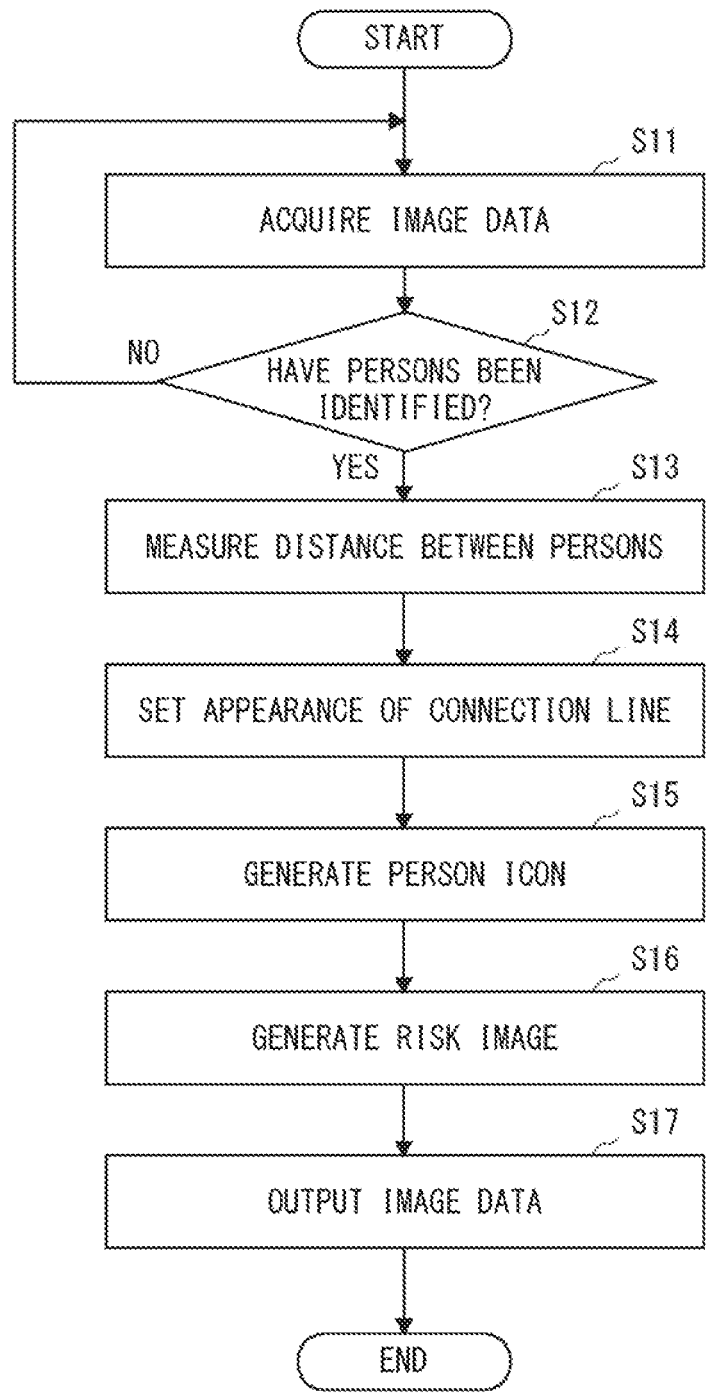
FIG. 2 is a flowchart showing a risk display method according to the first example embodiment.

Next, processes executed by the risk display apparatus 10 will be described with reference to FIG. 2. FIG. 2 is a flowchart showing a risk display method according to the first example embodiment. When, for example, a user who uses the risk display apparatus 10 performs an operation for instructing the start of the risk display method, the risk display apparatus 10 starts the processes.

First, the image data acquisition unit 111 acquires a plurality of pieces of image data from the camera (Step S11). Note that the image data acquisition unit 111 temporarily stores image data for a predetermined period, and then may supply it to other components. The predetermined period is, for example, 10 minutes, 30 minutes, or 60 minutes.

Next, the identification unit 112 determines whether or not the identification unit 112 has identified a plurality of persons from the image data (Step S12). When the identification unit 112 does not determine that the identification unit 112 has identified a plurality of persons from the image data (Step S12: NO), the risk display apparatus 10 returns to Step S11 and acquires new image data (Step S11). When the identification unit 112 determines that the identification unit 112 has identified a plurality of persons from the image data (Step S12: YES), the risk display apparatus 10 proceeds to Step S13.

In Step S13, the measurement unit 113 measures a distance between the persons from the image data (Step S13). Note that the positions of the persons in the image data may change with the passage of time. Therefore, the measurement unit 113 may calculate predetermined statistical values such as an average value and a minimum value with regard to the distance between the persons. The measurement unit 113 supplies information about the distance measured with regard to the identified person to the connection line setting unit 114.

Next, the connection line setting unit 114 sets an appearance of the connection line corresponding to each of the distances (Step S14). When the connection line setting unit 114 has set the appearance of the connection line, the connection line setting unit 114 supplies information about the set appearance to the image generation unit 116.

Next, the person icon generation unit 115 generates a person icon using, for example, an image of the person included in the image data (Step S15). The person icon generation unit 115 supplies information about the generated person icon to the image generation unit 116.

Next, the image generation unit 116 generates a risk image using the information received from the connection line setting unit 114 and the information received from the person icon generation unit 115 (Step S16).

Next, the output unit 117 outputs risk image data of the risk image (Step S17). When the output unit 117 outputs the risk image, the risk display apparatus 10 ends the series of processes.

The risk display apparatus 10 according to the first example embodiment has been described above. Note that the risk display apparatus 10 includes a processor and a storage device as components that are not shown. The storage apparatus included in the risk display apparatus 10 includes, for example, a storage device including a non-volatile memory such as a flash memory or a Solid State Drive (SSD). In this case, the storage apparatus included in the risk display apparatus 10 stores a computer program (hereafter also referred to simply as a program) for executing the risk display method described above. Further, the processor loads a computer program from the storage device into a buffer memory such as a Dynamic Random Access Memory (DRAM) and executes the loaded program.

Each of the components included in the risk display apparatus 10 may be implemented by dedicated hardware. Further, some or all of the components may be implemented by general-purpose or dedicated circuitry, a processor, or the like, or a combination thereof. They may be formed of a single chip, or may be formed of a plurality of chips connected to each other through a bus. Some or all of the components of each apparatus may be implemented by a combination of the above-described circuit or the like and a program. Further, as the processor, a Central Processing Unit (CPU), a Graphics Processing Unit (GPU), a field-programmable gate array (FPGA), or the like may be used. Note that the above descriptions of the configurations may also be applied to other apparatuses or systems described below in the present disclosure.

Further, when some or all of the components of the risk display apparatus 10 are implemented by a plurality of information processing apparatuses, circuits, or the like, the plurality of information processing apparatuses, circuits, or the like may be disposed in one place in a centralized manner or arranged in a discrete manner. For example, the information processing apparatuses, the circuits, or the like may be implemented as a form in which the information processing apparatuses, the circuits, or the like are connected to each other through a communication network, such as a client server system, a cloud computing system, or the like. Further, the functions of the risk display apparatus 10 may be provided in the form of Software as a Service (SaaS).

The first example embodiment has been described above. By the above-described configuration, the risk display apparatus 10 according to the first example embodiment shows a contact state between persons included in image data captured by the camera. A risk image output by the risk display apparatus 10 includes information about a distance between persons. Therefore, a user who visually recognizes a risk image can intuitively know the contact state between persons. For example, when one person has been infected with an infectious disease, there is a need to determine the risk of another person who has come into contact with the infected person being infected. In response to such a need, the risk display apparatus 10 can present a contact state between the persons. That is, according to this example embodiment, it is possible to provide a risk display apparatus and the like that are capable of collectively displaying multiple risks of infections that occur.

Second Example Embodiment

Figure 3:
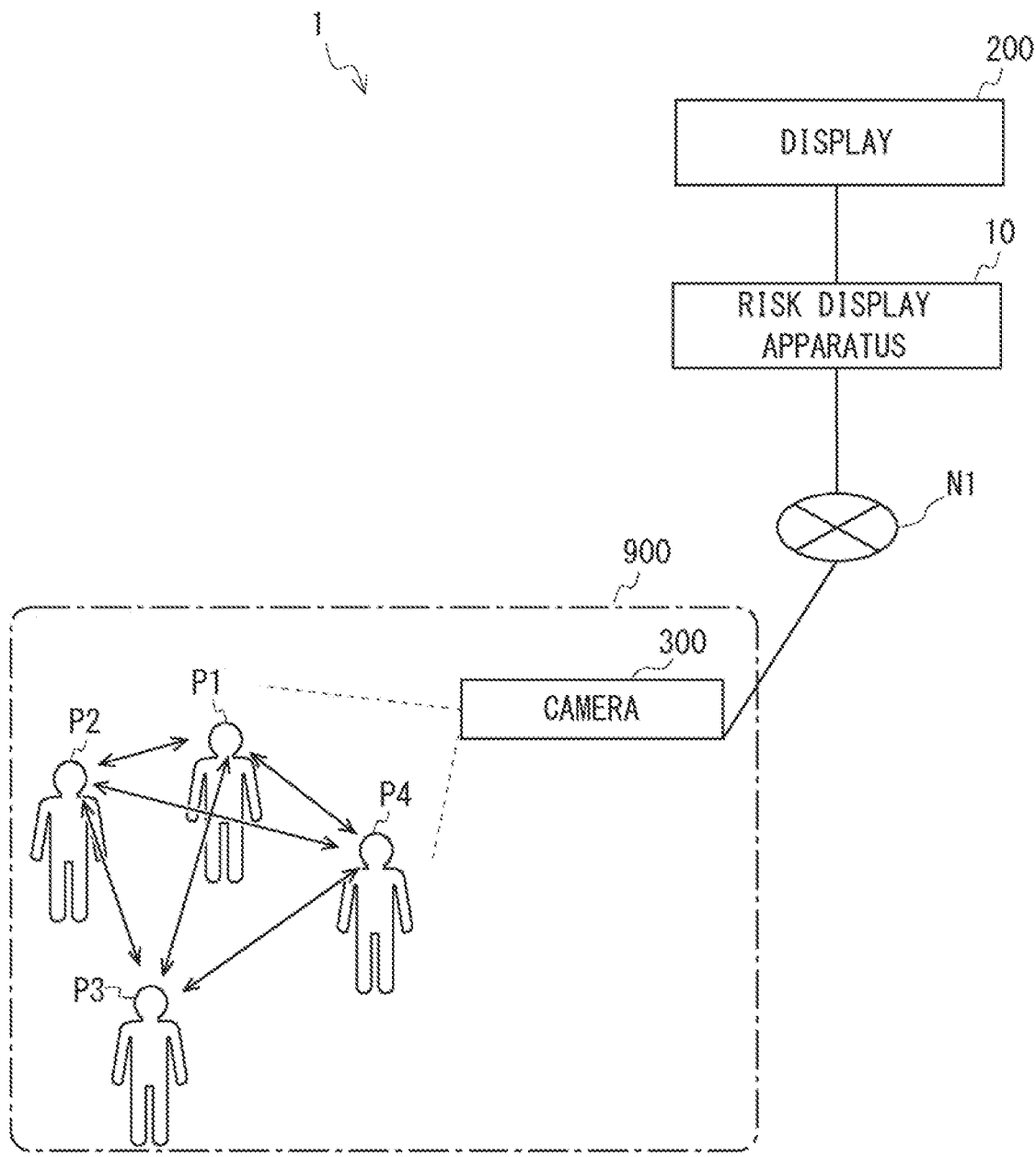
FIG. 3 is a block diagram of a risk display system according to a second example embodiment.

Next, a second example embodiment will be described. FIG. 3 is a block diagram of the risk display system according to the second example embodiment. FIG. 3 shows a risk display system 1. The risk display system 1 includes the risk display apparatus 10, a display 200, and a camera 300.

The risk display apparatus 10 according to this example embodiment, which is connected to the camera 300 through a communication network N1 so that it can communicate with the camera 300, acquires image data generated by the camera 300. Further, the risk display apparatus 10 is connected to the display 200 so that it can communicate with the display 200. The risk display apparatus 10 generates a risk image from image data acquired from the camera 300 and outputs the generated risk image to the display 200.

The display 200 is a display apparatus including, for example, a liquid crystal display and an organic electroluminescence. The display 200, which is connected to the risk display apparatus 10 so that it can communicate with the risk display apparatus 10, receives image data of the risk image from the risk display apparatus 10 and displays the received image data. Note that, in the example shown in FIG. 3, although the risk display apparatus 10 and the display 200 are connected to each other without using the communication network N1, they may instead be connected to each other through the communication network N1. A user of the risk display system 1 can know the contact state between persons included in the image captured by the camera 300 by visually recognizing the risk image displayed on the display 200.

The camera 300, which is fixed at a predetermined position in a facility 900, captures scenery of the facility 900. The camera 300 is connected to the risk display apparatus 10 through the communication network N1 so that it can communicate with the risk display apparatus 10. As shown in FIG. 3, for example, the camera 300 captures a scene where a first person P1, a second person P2, a third person P3, and a fourth person P4 are present at an angle of view indicated by a dotted line, generates image data, and supplies it to the risk display apparatus 10.

Next, a difference between the risk display apparatus 10 according to this example embodiment and that according to the first example embodiment will be described. In the risk display apparatus 10 according to this example embodiment, the measurement unit 113 measures a distance between persons and measures a time corresponding to each of the distances.

The measurement unit 113 according to this example embodiment acquires image data from the image data acquisition unit 111 and acquires information about persons from the identification unit 112, and then measures a distance between the persons and a time corresponding to each of the distances. Thus, the measurement unit 113 holds information about the distance between a plurality of the persons and the time elapsed at each of the distances. The measurement unit 113 supplies information about the identified person and information about the distance and time measured with regard to this person to the connection line setting unit 114.

The connection line setting unit 114 sets an appearance of the connection line based on the information about the distance and time received from the measurement unit 113. The connection line according to this example embodiment is a symbol for indicating a distance between two persons and the time elapsed at the distance. The connection line setting unit 114 sets the appearance of the connection line in such a form that a user can know a distance between persons included in the image data and the time elapsed at each of the distances by visually recognizing the appearance of the connection line. Examples of the appearance of the connection line include one of the length, thickness, color tone, and line style of the connection line.

More specifically, the connection line setting unit 114 may indicate, for example, a distance between persons by the length of the connection line. Alternatively, the connection line setting unit 114 may indicate, for example, the length of time corresponding to the distance between persons by the thickness of the connection line. However, the appearance of the connection line set by the connection line setting unit 114 is not limited to the above-described specific example. When the connection line setting unit 114 sets the appearance of the connection line, the connection line setting unit 114 supplies information related to this setting to the image generation unit 116.

Next, a differences between processes performed by the risk display apparatus 10 according to this example embodiment and those performed by the risk display apparatus 10 according to the first example embodiment will be described. The risk display apparatus 10 according to this example embodiment differs from that according to the first example embodiment in the process of Step S13 in the flowchart described with reference to FIG. 2.

In Step S13, the measurement unit 113 measures a distance between the persons and the time corresponding to each of the distances from the image data (Step S13). Note that the positions of the persons in the image data may change with the passage of time. Therefore, the measurement unit 113 may calculate predetermined statistical values such as an average value and a minimum value with regard to the distance between the persons. Similarly, regarding the time at the distance between the persons, the measurement unit 113 may calculate, for example, the passage of time in the range of a predetermined distance. The measurement unit 113 supplies information about the distance and the time measured with regard to the identified person to the connection line setting unit 114.

By the above-described configuration, the risk display apparatus 10 measures, from each of the position of the first person P1, the position of the second person P2, the position of the third person P3, and the position of the fourth person P4 captured by the camera 300, a distance between theses persons. Further, the risk display apparatus 10 measures a time associated with the distance regarding each of the first person P1, the second person P2, the third person P3, and the fourth person P4 from the image data acquired from the camera 300. Then the risk display apparatus 10 generates a risk image from the above-described information and outputs image data of the generated risk image to the display 200.

Figure 4:
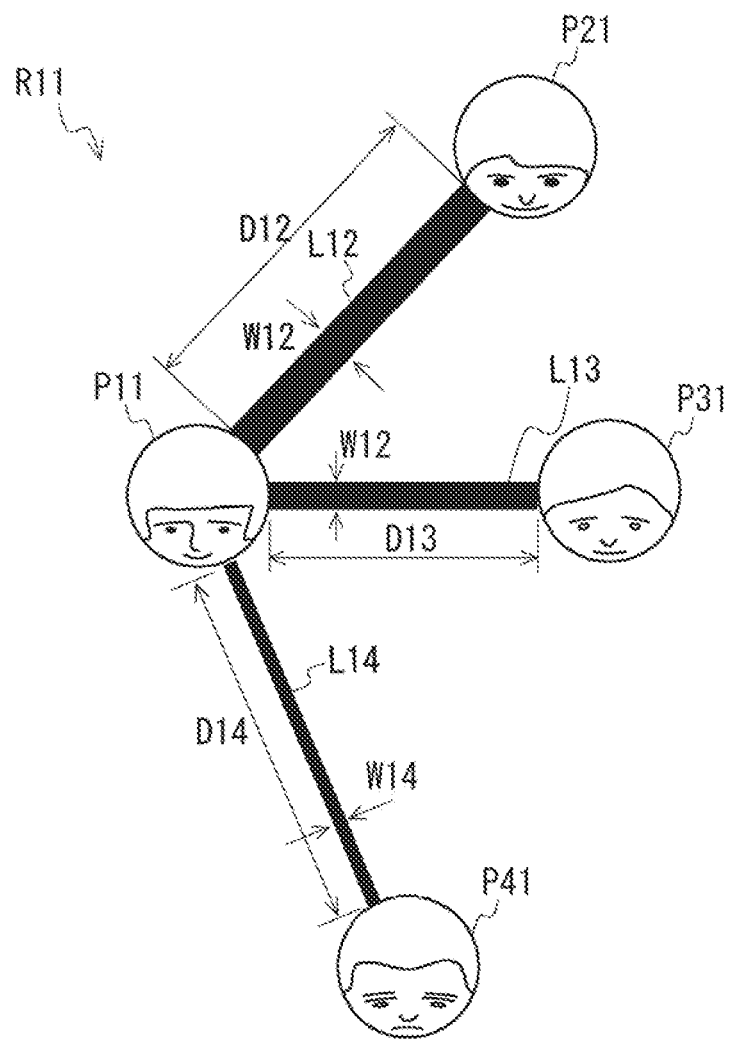
FIG. 4 is a diagram showing an example of a risk image generated by a risk display apparatus according to the second example embodiment.

Next, a risk image generated by the risk display apparatus 10 will be described with reference to FIG. 4. FIG. 4 is a diagram showing an example of the risk image generated by the risk display apparatus 10 according to the second example embodiment. FIG. 4 shows a contact state among the first person P1, the second person P2, the third person P3, and the fourth person P4 shown in FIG. 3 centered on the first person P1.

FIG. 4 shows a risk image R11. The risk image R11 includes a first icon P11, a second icon P21, a third icon P31, and a fourth icon P41. The first icon P11 is an icon indicating the first person P1. Similarly, the second icon P21 indicates the second person P2, the third icon P31 indicates the third person P3, and the fourth icon P41 indicates the fourth person P4. The person icon generation unit 115 extracts the face image of each of the first person P1 to the fourth person P4 from the image data captured by the camera 300 and generates the first icon P11 to the fourth icon P41.

In FIG. 4, the first icon P11 is connected to the second icon P21 by a connection line L12. The connection line L12 indicates a contact state between the first person P1 and the second person P2. Specifically, a length D12 of the connection line L12 indicates a distance between the first person P1 and the second person P2. That is, the shorter the distance between the first person P1 and the second person P2, the shorter the length D12 of the connection line L12 is displayed. Further, the longer the distance between the first person P1 and the second person P2, the longer the length D12 of the connection line L12 is displayed.

A thickness W12 of the connection line L12 indicates a length of time during which the first person P1 and the second person P2 have been present at a distance from each other corresponding to the length D12. That is, the longer the length of time that the first person P1 and the second person P2 have been present at a distance from each other corresponding to the length D12, the thicker the thickness W12 of the connection line L12 is displayed. The shorter the length of time that the first person P1 and the second person P2 have been present at a distance from each other corresponding to the length D12, the thinner the thickness W12 of the connection line L12 is displayed.

The first icon P11 is connected to the third icon P31 by a connection line L13. The connection line L13 indicates a contact state between the first person P1 and the third person P3. Specifically, a length D13 of the connection line L13 indicates a distance between the first person P1 and the third person P3. A thickness W13 of the connection line L13 indicates a length of time during which the first person P1 and the third person P3 have been present at a distance from each other corresponding to the length D13.

Similarly, the first icon P11 is connected to the fourth icon P41 by a connection line L14. The connection line L14 indicates a contact state between the first person P1 and the fourth person P4. Specifically, a length D14 of the connection line L14 indicates a distance between the first person P1 and the fourth person P4. A thickness W14 of the connection line L14 indicates a length of time during which the first person P1 and the fourth person P4 have been present at a distance from each other corresponding to the length D14.

Note that the length and the thickness of the connection line in the risk image R11 are set for the purpose of enabling a user who visually recognizes the risk image to easily know the contact state between persons. Note that, for example, the length of the connection line in the risk image R11 may be a length obtained by reducing a distance measured by the measurement unit 113, or a length obtained by multiplying a distance measured by the measurement unit 113 by a predetermined coefficient.

The thickness of the connection line set by the connection line setting unit 114 corresponds to a cumulative value of the time when the distance between two persons has become shorter than a predetermined threshold. For example, the thickness of the connection line in the risk image R11 may be a thickness proportional to the time measured by the measurement unit 113 or a thickness obtained by multiplying the time measured by the measurement unit 113 by a predetermined coefficient.

The risk image R11 shown in FIG. 4 has been described above. The connection line setting unit 114 according to this example embodiment sets a length of the connection line corresponding to the distance between persons and a thickness of the connection line corresponding to the time. Note that the risk display apparatus 10 may be configured to generate the above-described risk image only when the distance between persons is shorter than a predetermined threshold. By the above-described configuration, the risk display apparatus 10 can generate a risk image in accordance with the risk of infection.

The length of the connection line set by the connection line setting unit 114 according to this example embodiment may correspond to an average value of the distance when the distance between two persons has become shorter than a predetermined threshold. Further, the length of the connection line set by the connection line setting unit 114 may correspond to a minimum value of the distance when the distance between two persons has become shorter than a predetermined threshold. Further, the risk display apparatus 10 may be configured so that contents indicated by the length of the connection line in the risk image can be switched in response to a user's request. By doing so, the risk display apparatus 10 can display a contact state desired by a user.

As described above, the image generation unit 116 selects one person icon as a selection icon and places other person icons near the selection icon. In the example shown in FIG. 4, the selection icon is the first icon P11, and the other person icons are the second icon P21, the third icon P31, and the fourth icon P41. By visually recognizing the risk image R11, a user can intuitively know the contact state between the first person P1 and each one of other persons (i.e., the second person P2, the third person P3, and the fourth person P4) present near the first person P1.

When the image generation unit 116 accepts a process in which one person icon is selected from among the other person icons, the image generation unit 116 may place the selected person icon as a selection icon. For example, in FIG. 4, when a user performs an operation for selecting the second icon P21, the image generation unit 116 accepts a process of selecting the second icon P21. In this case, the image generation unit 116 switches the current risk image to the risk image showing the contact state between the second person P2 corresponding to the second icon P21 and each one of other persons present near the second person P2.

The second example embodiment has been described above. As described above, the risk display apparatus 10 can collectively recognize the contact state between the person corresponding to the selection icon and each one of other persons present near this person. That is, according to this example embodiment, it is possible to provide a risk display apparatus and the like that are capable of collectively displaying multiple risks of infections that occur.

Third Example Embodiment

Next, a third example embodiment will be described. An object to be measured by the measurement unit 113 and a display form of a risk image according to the third example embodiment are different from those according to the above-described example embodiments.

The measurement unit 113 according to this example embodiment measures a distance between persons identified from image data and a time corresponding to each of the distances, as well as a position of each of the persons and a direction in which the face of each of the persons is facing. That is, the measurement unit 113 measures a direction in which the face of each of two persons is facing when the distance between the two persons has become shorter than a predetermined threshold. The measurement unit 113 holds information about the distance between a plurality of the persons and the time elapsed at each of the distances as well as information about a position of each of the persons and a direction in which the face of each of the persons is facing.

The measurement unit 113 supplies these pieces of information about the identified person to the connection line setting unit 114 and the image generation unit 116.

The image generation unit 116 receives information about the position of each of the persons and the direction in which the face of each of the persons is facing from the measurement unit 113 in addition to information about the appearance of the connection line and information about the person icon. Then the image generation unit 116 generates a risk image from these received pieces of information. That is, the image generation unit 116 places a person icon based on the direction in which the face of the person is facing. More specifically, the image generation unit 116 places other person icons to be placed near the selection icon at an angle relative to a direction in which the face of the selection icon is facing. Further, the image generation unit 116 may place other person icons to be placed near the selection icon so that a direction in which the face of each of the other person icons is facing is set at an angle relative to a direction in which the face of the selection icon is facing.

Note that the relative angle and the direction in which the face of the person is facing may change with the passage of time in a state in which they are closer to the above-described threshold. Therefore, the image generation unit 116 calculates a relative angle between person icons and a direction in which the face of each of the person icons is facing based on predetermined statistical values such as an average value and an angle at which they have stayed the longest.

Further, when the image generation unit 116 according to this example embodiment generates a risk image, the image generation unit 116 extracts the distance between the person corresponding to the selection icon and a person near this person, and generates a risk image when the extracted distance is less than a preset threshold. The image generation unit 116 supplies the generated risk image to the output unit 117.

Figure 5:
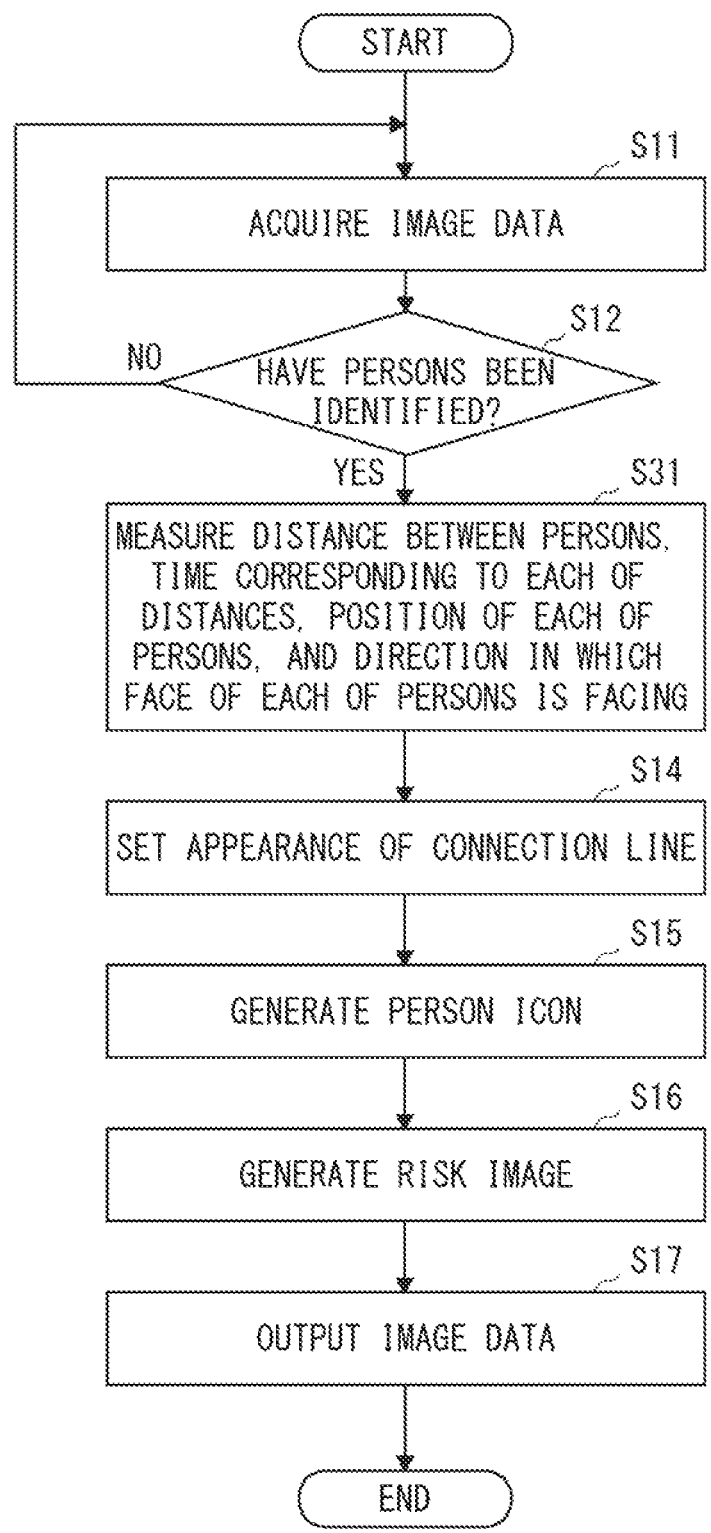
FIG. 5 is a flowchart showing a risk display method according to a third example embodiment.

Next, processes performed by the risk display apparatus 10 according to the third example embodiment will be described with reference to FIG. 5. FIG. 5 is a flowchart showing a risk display method according to the third example embodiment. The flowchart shown in FIG. 5 differs from the flowchart shown in FIG. 2 in that it includes Step S31 instead of Step S13. The flowchart shown in FIG. 5 will be described below with a focus on differences between it and the flowchart shown in FIG. 2.

In this example embodiment, in the process of determining whether or not the identification unit 112 has identified a plurality of persons from the image data (Step S12), when the identification unit 112 determines that the identification unit 112 has identified a plurality of persons from the image data (Step S12: YES), the risk display apparatus 10 proceeds to Step S31.

In Step S31, the measurement unit 113 measures a distance between the persons from the image data and the time corresponding to each of the distances. Further, the measurement unit 113 measures a position of each of the persons identified in the image data and a direction in which the face of each of these persons is facing (Step S31). The measurement unit 113 supplies, among these measured pieces of information, information about the distance between the persons and the time corresponding to each of the distances to the connection line setting unit 114. The measurement unit 113 also supplies, among these measured pieces of information, information about the position of each of the identified persons and the direction in which the face of each of the identified persons is facing to the image generation unit 116.

After the above-described process, in Step S17 in this example embodiment, the image generation unit 116 takes into account the position of each of the persons and the direction in which the face of each of the persons is facing and then generates a risk image.

Figure 6:
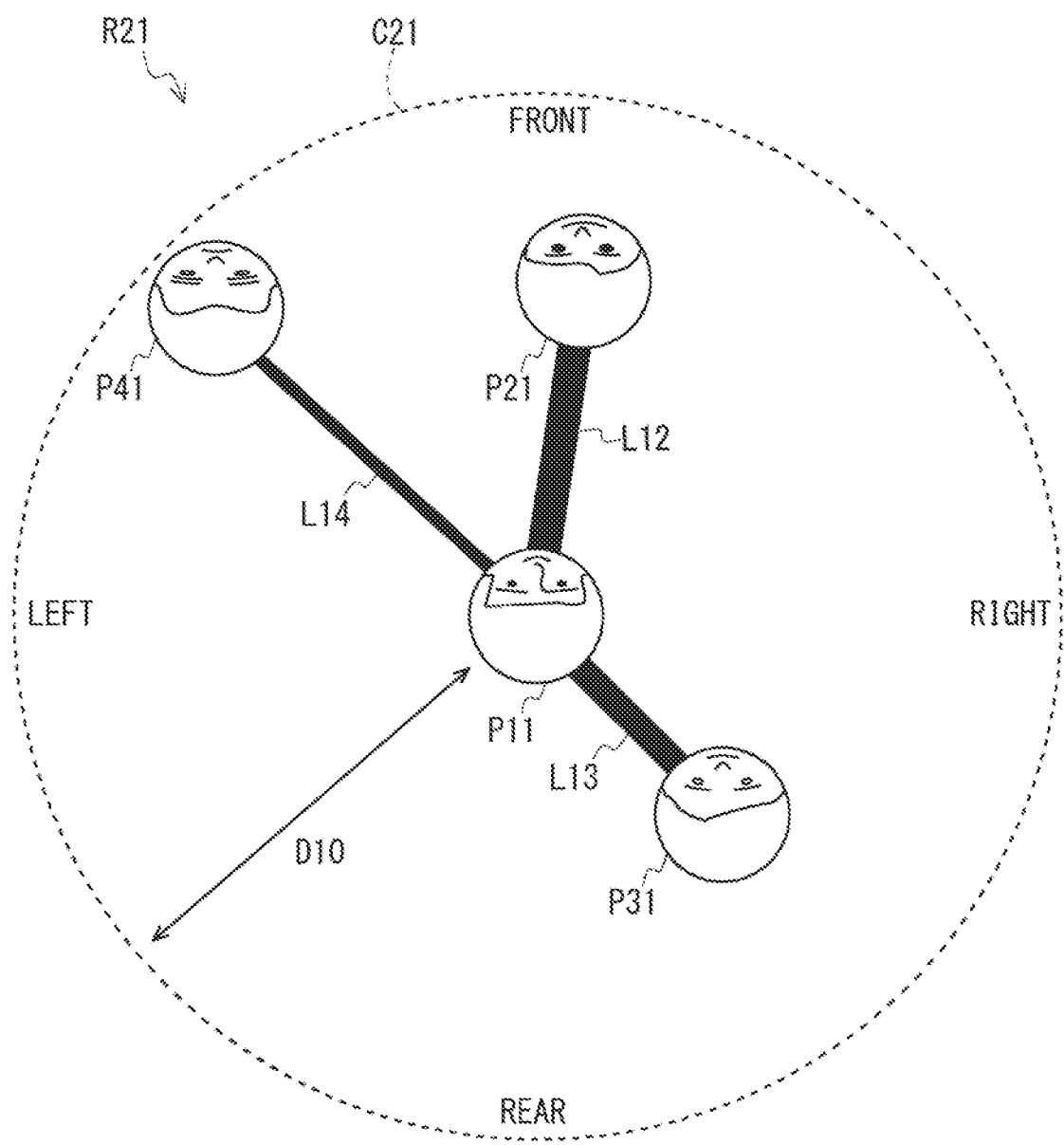
FIG. 6 is a diagram showing a first example of a risk image generated by a risk display apparatus according to the third example embodiment.

An example of a risk image generated by the risk display apparatus 10 will be described with reference to FIG. 6. FIG. 6 is a diagram showing a first example of a risk image generated by the risk display apparatus according to the third example embodiment. FIG. 6 shows a risk image R21. In the risk image R21, the first icon P11 is selected as a selection icon and placed in the center.

The first icon P11 is placed so that the face of the first person P1 is extracted and the front of the extracted face image faces the upper direction of FIG. 6. That is, the upper side of FIG. 6 indicates the front for the first person P1 corresponding to the first icon P11. The lower side of FIG. 6 indicates the rear for the first person P1 corresponding to the first icon P11. Similarly, the right side of FIG. 6 indicates the right side for the first person P1 corresponding to the first icon P11, while the left side of FIG. 6 indicates the left side for the first person P1 corresponding to the first icon P11.

Further, a circle C21 drawn by a dotted line is shown around the first icon P11. The first icon P11 is placed at the center of this circle C21. A distance D10 is a distance between the first icon P11 and the outer edge of the circle C21. The distance D10 corresponds to a threshold Dth of the distance set in advance in the facility 900. The image generation unit 116 displays, inside the circle C21, person icons of persons present near the first person P1 at a distance less than the threshold Dth from the first person P1.

In FIG. 6, each of the second icon P21, the third icon P31, and the fourth icon P41 corresponding to other persons is placed near the first icon P11. The second icon P21 is connected to the first icon P11 by the connection line L12 described with reference to FIG. 4. Similarly, the third icon P31 is connected to the first icon P11 by the connection line L13, and the fourth icon P41 is connected to the first icon P11 by the connection line L14. Further, the second icon P21, the third icon P31, and the fourth icon P41 are respectively placed at positions corresponding to the relative positional relation with the first person P1 in the facility 900.

For example, the second person P2 corresponding to the second icon P21 has been present in front of the first person P1 in the facility 900. Therefore, the second icon P21 is placed in front of the first icon P11. Similarly, the third person P3 has been present at the right rear of the first person P1 in the facility 900. Therefore, the third icon P31 is placed at the right rear of the first icon P11. The fourth person P4 has been present at the left front of the first person P1 in the facility 900. Therefore, the fourth icon P41 is placed at the left front of the first icon P11.

By the above-described configuration, the risk display apparatus 10 generates a risk image showing the distance between the selection icon and each of other person icons, the time corresponding to each of the distances, and the direction in which each of these icons is facing.

Figure 7:
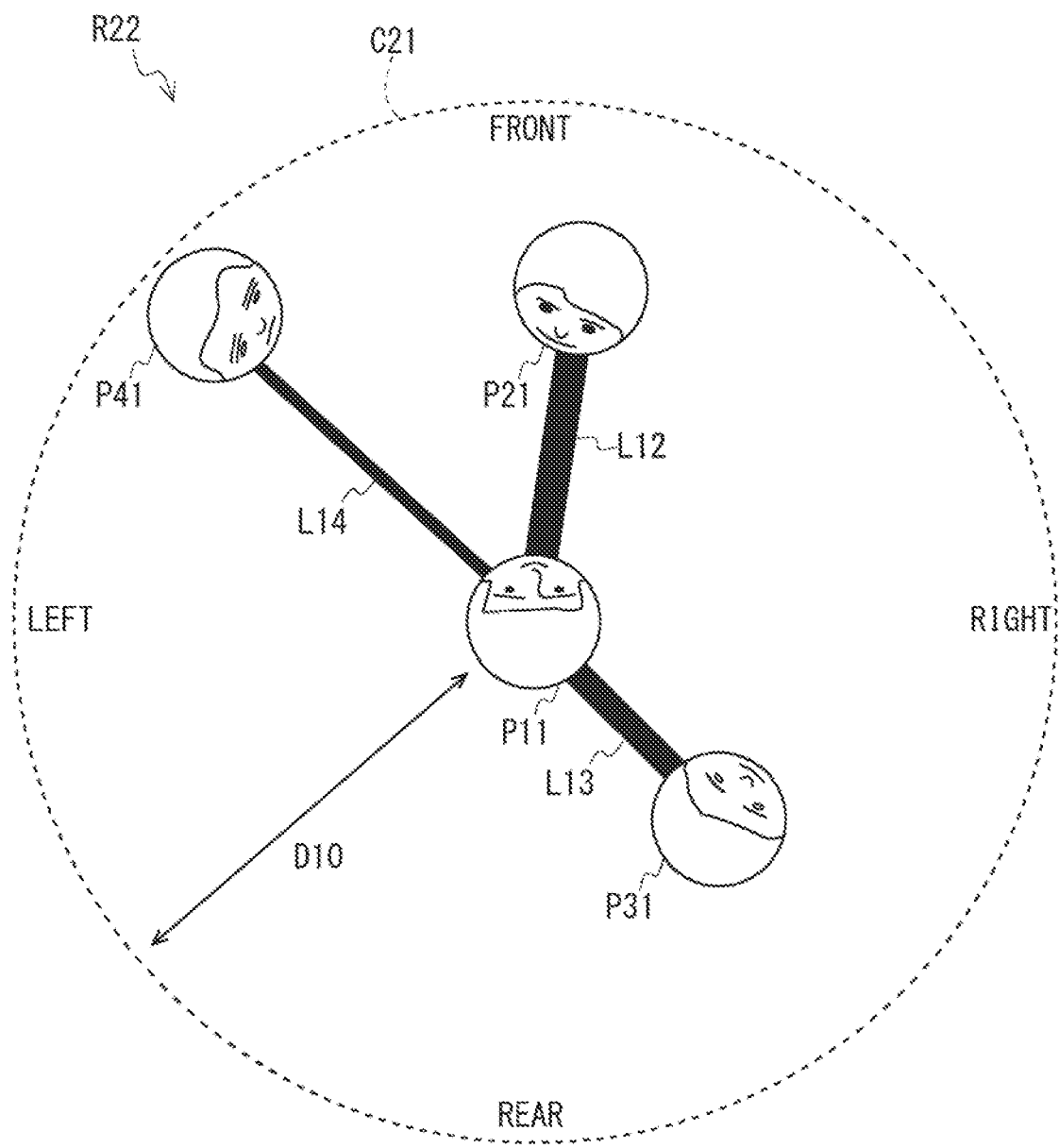
FIG. 7 is a diagram showing a second example of the risk image generated by the risk display apparatus according to the third example embodiment.

Another example of a risk image generated by the risk display apparatus 10 will be described with reference to FIG. 7. FIG. 7 is a diagram showing a second example of the risk image generated by the risk display apparatus according to the third example embodiment. FIG. 7 shows a risk image R22. The risk image R22 differs from the risk image R21 shown in FIG. 6 in that the directions in which the faces of other person icons are facing present near the first icon P11, which is a selection icon, are further displayed.

For example, the second person P2 corresponding to the second icon P21 has been present in front of the first person P1 in the facility 900, and has been facing the first person P1 most of the time. Therefore, the second icon P21 is placed in front of the first icon P11, and the front of the face image of the second icon P21 is facing the first icon P11. The third person P3 has been present at the right rear of the first person P1 in the facility 900, and has not been facing the first person P1 and instead has been facing the right most of the time. Therefore, the third icon P31 is placed at the right rear of the first icon P11 so that the direction in which the front of the face image of the third icon P31 is facing is shifted from the front direction to a direction to the right of the first icon P11. The fourth person P4 has been present at the left front of the first person P1 in the facility 900, and has been facing the second person P2 most of the time. Therefore, the fourth icon P41 is placed at the left front of the first icon P11, and the front of the face image of the fourth icon P41 faces the second icon P21.

By displaying the above-described risk image R22, the risk display apparatus 10 can show the details of the contact state between persons in such a form that a user can easily know them. Therefore, according to this example embodiment, it is possible to provide a risk display apparatus and the like that are capable of collectively displaying multiple risks of infections that occur.

Fourth Example Embodiment

Figure 8:
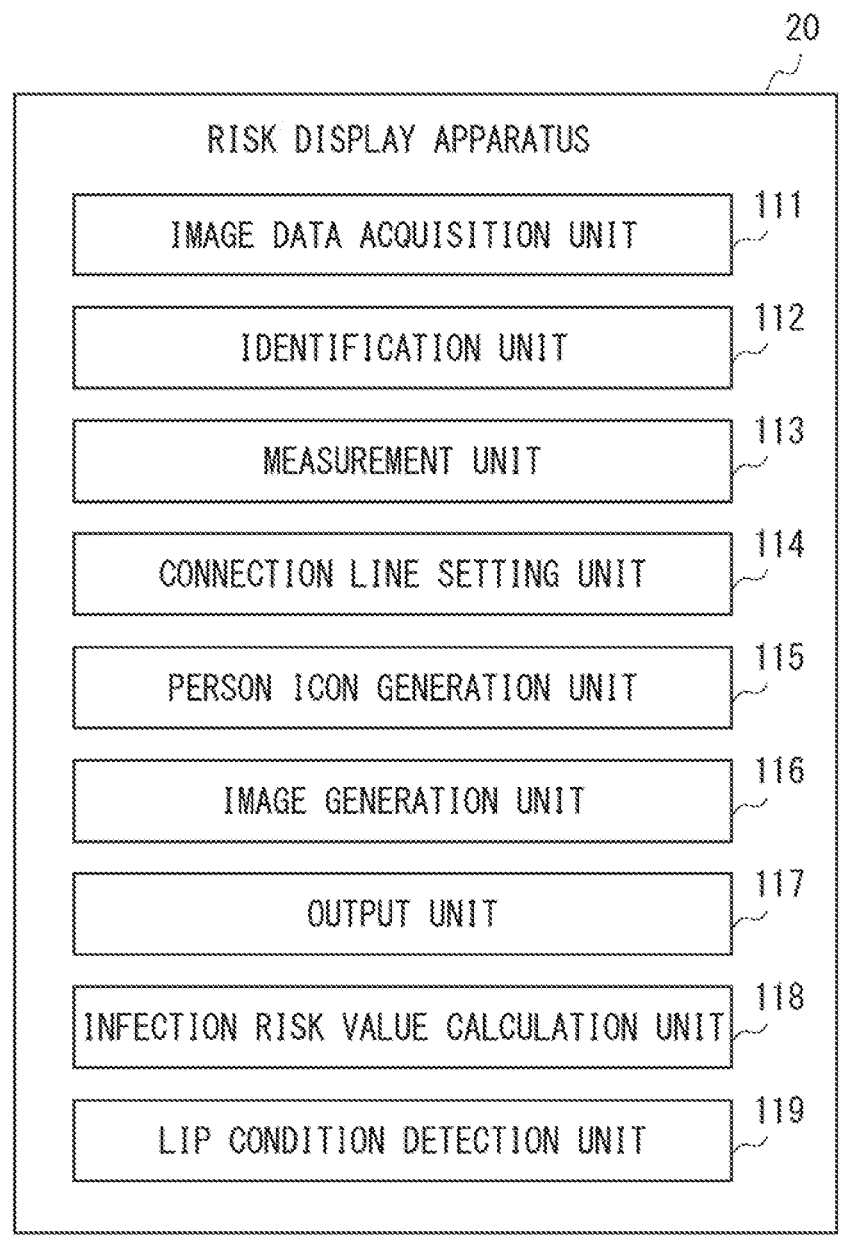
FIG. 8 is a block diagram of a risk display apparatus according to a fourth example embodiment.

Next, a fourth example embodiment will be described. The fourth example embodiment differs from the above-described example embodiments in that an infection risk value is displayed. FIG. 8 is a block diagram of a risk display apparatus 20 according to the fourth example embodiment. The risk display apparatus 20 according to this example embodiment includes an infection risk value calculation unit 118 and a lip condition detection unit 119.

The infection risk value calculation unit 118 calculates an infection risk value based on at least a distance and a time regarding two persons. The infection risk value is an index indicating the possibility of a person being infected with a preset infectious disease, and is indicated by a preset numerical value. For example, the infection risk value is defined by numerical values from 0 to 1. In this case, for example, a numerical value of 0 means the lowest risk of infection and a numerical value of 1 means the highest risk of infection. Note that the "risk of infection" means that the higher the numerical value, the higher the possibility of a person being infected. More specifically, for example, the risk of infection is relatively high in a situation in which two persons talk to each other at close range. Information as elements for calculating an infection risk value is, for example, a distance between two persons, the time corresponding to the distance, and the direction in which the face of each of the two persons is facing. Further, the information as for calculating an infection risk value may include a condition of the lips of a person. The condition of the lips may include information such as whether or not a person is having a conversation, putting on a mask, coughing, or sneezing. After the infection risk value calculation unit 118 calculates the infection risk value, the infection risk value calculation unit 118 supplies information about the calculated infection risk value to the connection line setting unit 114.

The lip condition detection unit 119 detects a condition of the lips of each person from image data. For example, the lip condition detection unit 119 detects that a person is opening and closing the mouth, coughing, and sneezing. When the lip condition detection unit 119 detects the condition of the lips, the lip condition detection unit 119 supplies information about the detected condition of the lips to the infection risk value calculation unit 118. In this case, the infection risk value calculation unit 118 takes into account the condition of the lips and then calculates an infection risk value.

The connection line setting unit 114 receives information about an infection risk value from the infection risk value calculation unit 118 and sets the appearance of the connection line in accordance with the received infection risk value. More specifically, for example, the connection line setting unit 114 may set a color tone of the connection line in accordance with the infection risk value.

Figure 9:
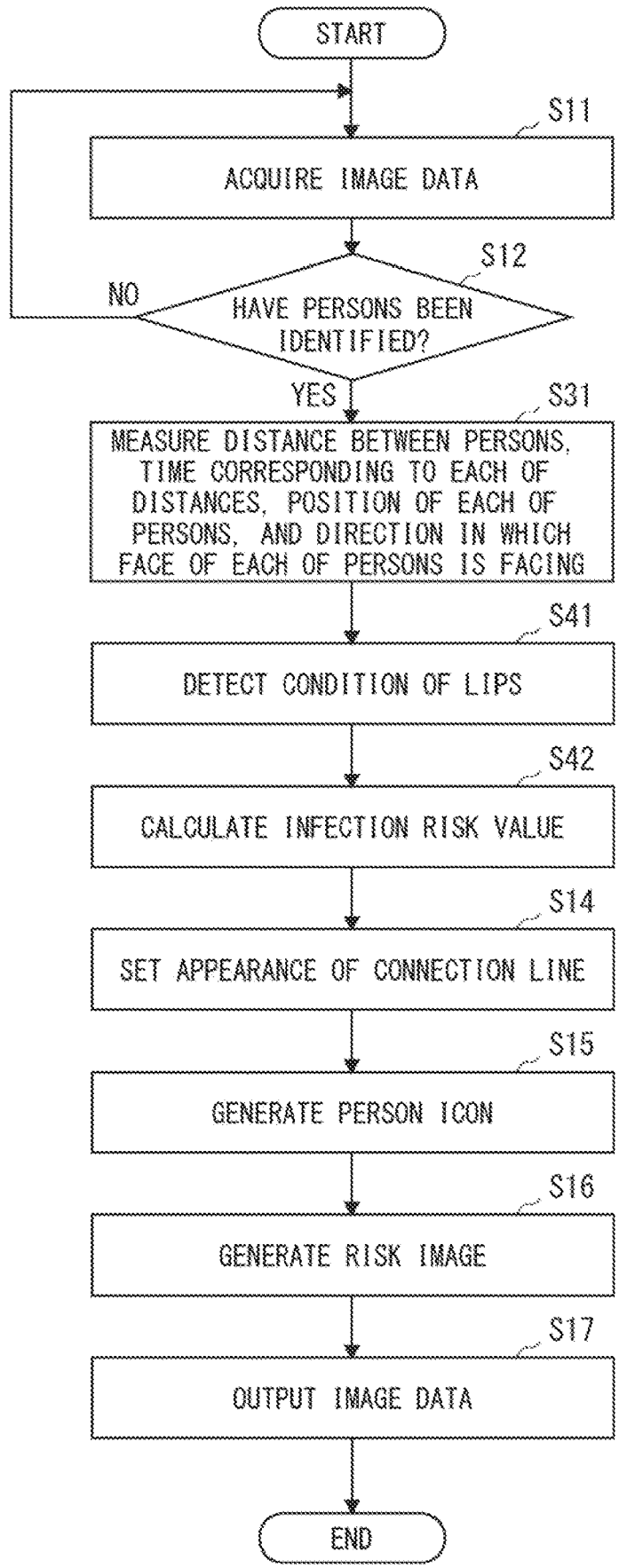
FIG. 9 is a flowchart showing a risk display method according to the fourth example embodiment.

FIG. 9 is a flowchart showing a risk display method according to the fourth example embodiment. The flowchart shown in FIG. 9 differs from the flowchart described with reference to FIG. 5 in the processes between Step S31 and Step S14.

After Step S31, the lip condition detection unit 119 detects a condition of the lips from the image data (Step S41). When the lip condition detection unit 119 has detected the condition of the lips, the lip condition detection unit 119 supplies information about the detected condition of the lips to the infection risk value calculation unit 118.

Next, the infection risk value calculation unit 118 acquires information about the distance between persons, and the time corresponding to each of the distances, the direction in which the face of each of the persons is facing, and the condition of the lips regarding each of the persons, and calculates an infection risk value from these acquired pieces of information (Step S42). After the infection risk value calculation unit 118 calculates the infection risk value, the infection risk value calculation unit 118 supplies information about the calculated infection risk value to the connection line setting unit 114.

Next, the connection line setting unit 114 acquires information about the distance between persons and the time corresponding to this distance. Further, the connection line setting unit 114 acquires information about the infection risk value. Then the connection line setting unit 114 sets an appearance of the connection line from these pieces of information (Step S14). Since the subsequent processes are similar to those in the flowchart described above, the descriptions thereof will be omitted here.

Figure 10:
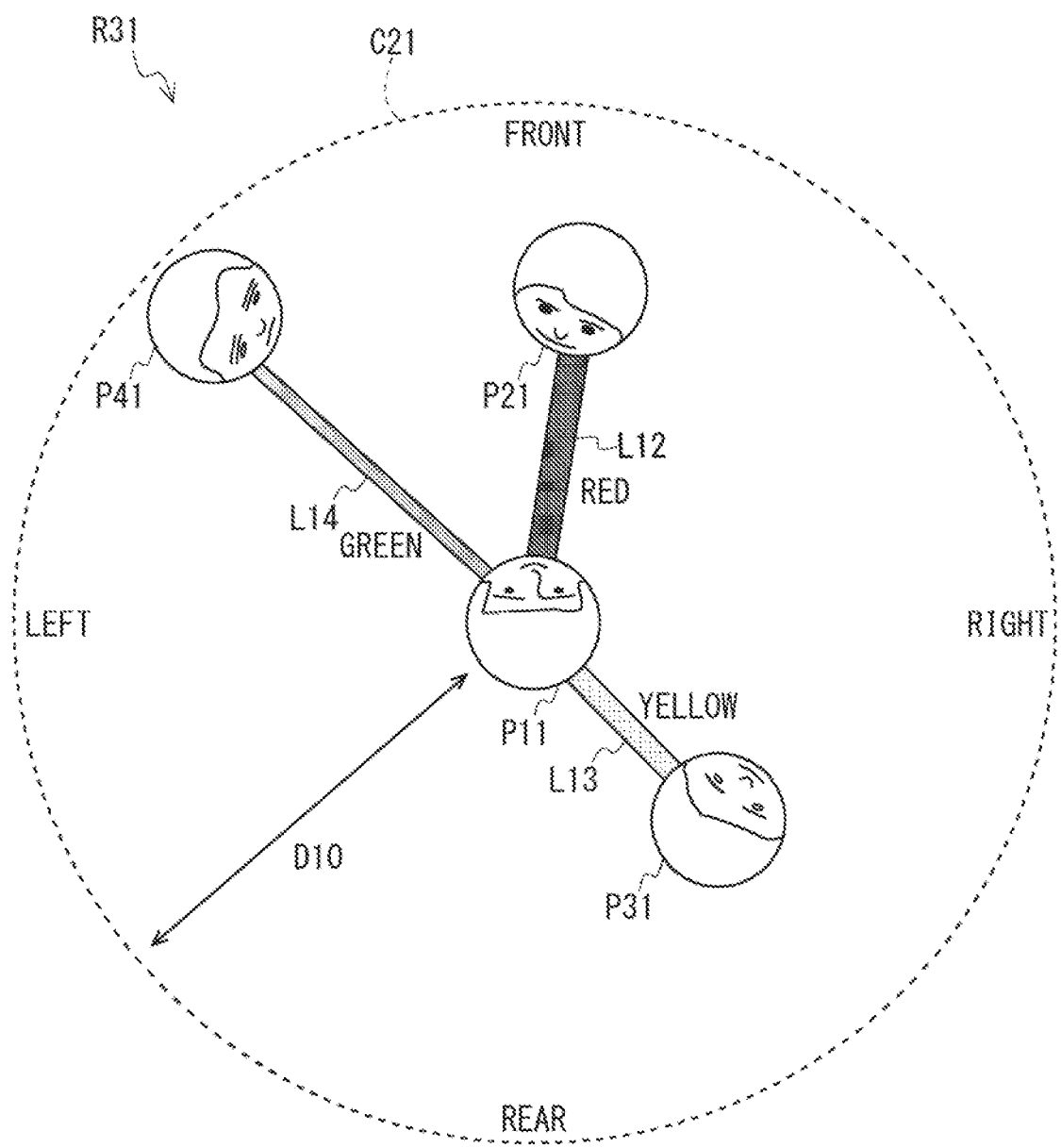
FIG. 10 is a diagram showing an example of an image displayed by the risk display apparatus according to the fourth example embodiment.

FIG. 10 is a diagram showing an example of an image displayed by the risk display apparatus according to the fourth example embodiment. FIG. 10 shows a risk image R31. In the risk image R31, each of the connection lines has a color tone. Specifically, the connection line L12 is red, the connection line L13 is yellow, and the connection line L14 is green. In this example, a red color indicates the highest infection risk value, a green color indicates the lowest infection risk value, and a yellow color indicates an infection risk value that is lower than that indicated by the red color and higher than that indicated by the green color.

The fourth example embodiment has been described above. The risk display apparatus 20 according to this example embodiment calculates an infection risk value and sets an appearance of the connection line in accordance with the calculated infection risk value. By this configuration, the risk display apparatus 20 can recognize the contact state between the person corresponding to the selection icon and another person along with the infection risk value. Therefore, according to this example embodiment, it is possible to provide a risk display apparatus and the like that are capable of collectively displaying multiple risks of infections that occur.

Modified Example of Fourth Example Embodiment

Figure 11:
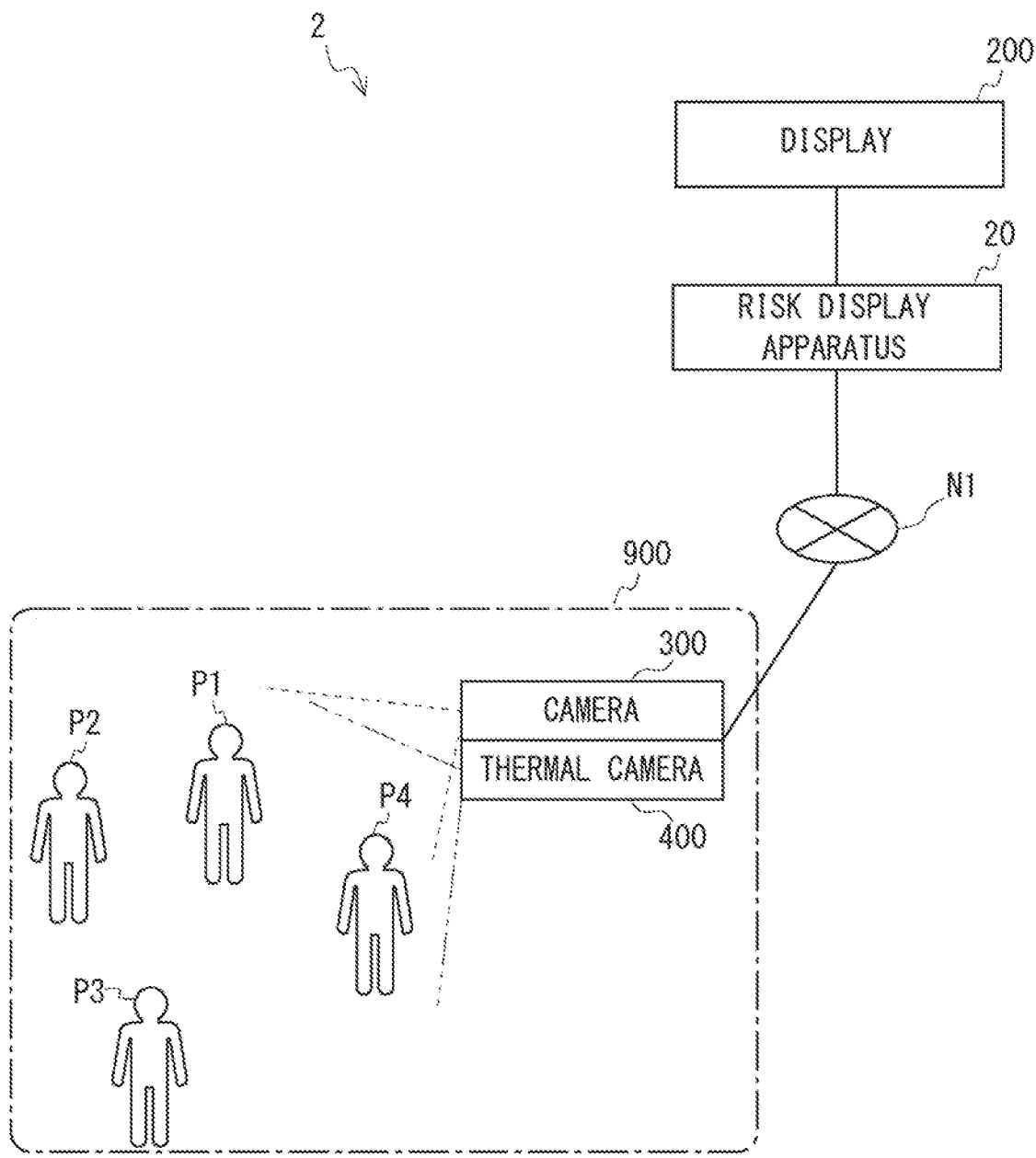
FIG. 11 is a block diagram of a risk display system according to a modified example of the fourth example embodiment.

Next, a modified example of the fourth example embodiment will be described. FIG. 11 is a block diagram of a risk display system 2 according to the modified example of the fourth example embodiment. The risk display system 2 shown in FIG. 11 differs from that according to the above-described example embodiments in that the facility 900 includes a thermal camera 400.

The thermal camera 400 generates thermal image data at an angle of view corresponding to the capturing range of the camera 300, and supplies the generated thermal image data to the risk display apparatus 20. When the risk display apparatus 20 acquires the thermal image data from the thermal camera 400, the risk display apparatus 20 measures a body surface temperature of the person identified by the measurement unit 113. Then the infection risk value calculation unit 118 takes into account the body surface temperature and then calculates an infection risk value. By doing so, the risk display apparatus 20 can calculate an infection risk value in more detail. Therefore, according to this example embodiment, it is possible to provide a risk display apparatus and the like that are capable of collectively displaying multiple risks of infections that occur.

Example of Hardware Configuration

A description will be given below of a case in which each functional component of the risk display apparatus according to the present disclosure is implemented by a combination of hardware and software.

Figure 12:
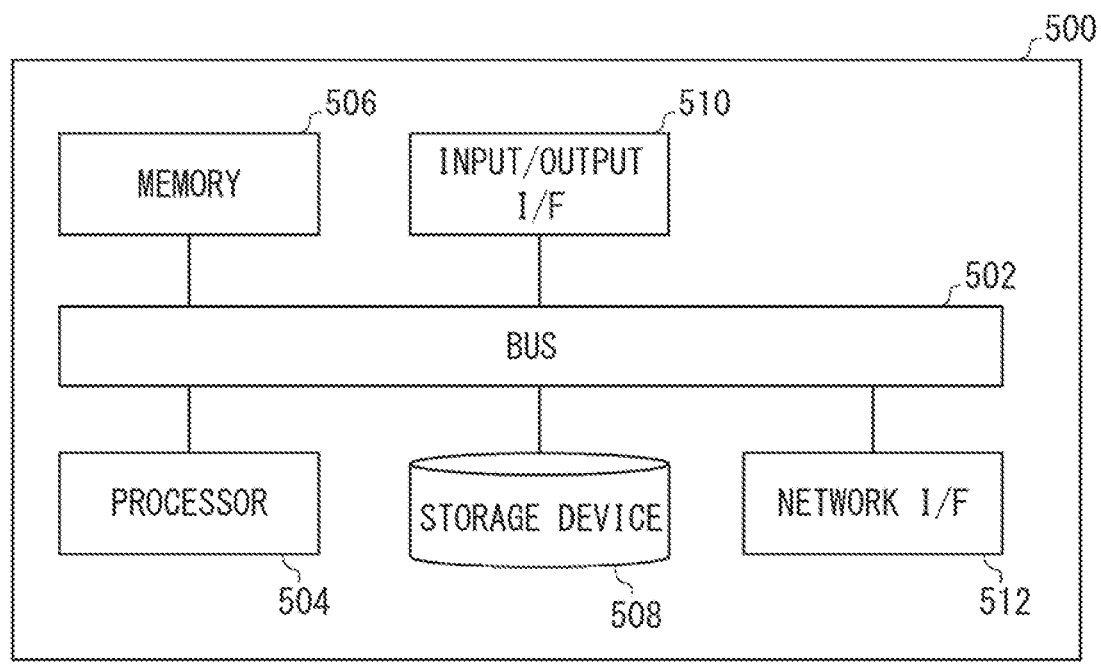
FIG. 12 is a block diagram showing an example of a hardware configuration of a computer.

FIG. 12 is a block diagram showing an example of a hardware configuration of a computer. The risk display apparatus according to the present disclosure can implement the above-described functions with a computer 500 including the hardware configuration shown in the figure. The computer 500 may be a portable computer such as a smartphone or a tablet terminal, or a stationary computer such as a PC. The computer 500 may be a dedicated computer designed to implement each of the apparatuses, or a general-purpose computer. By installing a predetermined application (s) in the computer 500, the computer 500 can implement desired functions.

The computer 500 includes a bus 502, a processor 504, a memory 506, a storage device 508, an input/output interface (I/F) 510, and a network interface (I/F) 512. The bus 502 is a data transmission path through which the processor 504, the memory 506, the storage device 508, the input/output interface 510, and the network interface 512 transmit and receive data to and from each other. However, a method for connecting the processor 504 and the like to each other is not limited to the method for connecting these to each other by the bus.

The processor 504 is any of various types of processors such as a CPU, a GPU, or an FPGA. The memory 506 is a main storage device implemented by using a Random Access Memory (RAM) or the like.

The storage device 508 is an auxiliary storage device implemented by using a hard disk, an SSD, a memory card, or a Read Only Memory (ROM). The storage device 508 stores a program(s) for implementing desired functions. The processor 504 loads this program(s) into the memory 506 and executes the loaded program(s), thereby implementing the functional components of each of the apparatuses.

The input/output interface 510 is an interface for connecting the computer 500 to an input/output device(s). For example, an input device such as a keyboard and an output device such as a display device are connected to the input/output interface 510.

The network interface 512 is an interface for connecting the computer 500 to a network.

Note that the present invention is not limited to the above-described example embodiments and may be changed as appropriate without departing from the scope and spirit of the present invention.

The whole or part of the example embodiments disclosed above can be described as, but not limited to, the following supplementary notes.
(Supplementary Note 1)
  A risk display apparatus comprising:
    image data acquisition means for acquiring image data from a camera; identification means for identifying a plurality of persons from the image data;
    measurement means for measuring a distance between the persons;
    connection line setting means for setting an appearance of a connection line corresponding to each of the distances;
    person icon generation means for generating a person icon indicating the person based on the image data;
    image generation means for generating a risk image in which a plurality of the person icons are connected to each other through the connection lines; and
    output means for outputting risk image data of the risk image.
(Supplementary Note 2)
  The risk display apparatus according to Supplementary note 1, wherein the connection line setting means sets a length of the connection line corresponding to the distance.
(Supplementary Note 3)
  The risk display apparatus according to Supplementary note 1 or 2, wherein
    the measurement means further measures a time corresponding to the distance, and
    the connection line setting means sets an appearance of the connection line corresponding to the distance and the time.
(Supplementary Note 4)
  The risk display apparatus according to Supplementary note 3, wherein the connection line setting means sets a thickness of the connection line corresponding to the time.
(Supplementary Note 5)
  The risk display apparatus according to Supplementary note 2, wherein the length of the connection line set by the connection line setting means corresponds to an average value of the distances when the distance between two of the persons has become shorter than a predetermined threshold.
(Supplementary Note 6)
  The risk display apparatus according to Supplementary note 4, wherein the thickness of the connection line set by the connection line setting means corresponds to a cumulative value of the times when the distance between two of the persons has become shorter than a predetermined threshold.
(Supplementary Note 7)
  The risk display apparatus according to any one of Supplementary notes 1 to 6, wherein the image generation means selects one of the person icons as a selection icon, and places the person icons other than the selection icon near the selection icon.

(Supplementary Note 8)
The risk display apparatus according to Supplementary note 7, wherein when the image generation means accepts a process in which one of the person icons is selected from among the other person icons, the image generation means places the selected person icon as the selection icon.

(Supplementary Note 9)
The risk display apparatus according to Supplementary note 7 or 8, wherein
the measurement means measures a direction in which a face of each of the two of the persons is facing when the distance between the two of the persons has become shorter than a predetermined threshold, and
the person icon generation means generates the person icons respectively including the faces of the two of the persons, and
the image generation means places the person icons based on the respective directions in which the faces of the two of the persons are facing.

(Supplementary Note 10)
The risk display apparatus according to Supplementary note 9, wherein the image generation means places the other person icons to be placed near the selection icon at an angle relative to a direction in which the face of the selection icon is facing.

(Supplementary Note 11)
The risk display apparatus according to Supplementary note 9 or 10, wherein the image generation means places the other person icons to be placed near the selection icon so that a direction in which the face of each of the other person icons is facing is set at an angle relative to a direction in which the face of the selection icon is facing.

(Supplementary Note 12)
The risk display apparatus according to any one of Supplementary notes 1 to 11, further comprising infection risk value calculation means for calculating an infection risk value based on at least the distance between the two of the persons,
wherein the connection line setting means sets the appearance of the connection line in accordance with the infection risk value.

(Supplementary Note 13)
The risk display apparatus according to Supplementary note 12, further comprising lip condition detection means for detecting a condition of lips of each of the persons,
wherein the infection risk value calculation means further takes into account the condition of the lips and then calculates the infection risk value.

(Supplementary Note 14)
The risk display apparatus according to Supplementary note 12 or 13, wherein
the image data acquisition means further acquires thermal image data from a thermal camera,
the measurement means measures a body surface temperature of each of the persons based on the thermal image data, and
the infection risk value calculation means further takes into account the body surface temperature and then calculates the infection risk value.

(Supplementary Note 15)
The risk display apparatus according to any one of Supplementary notes 12 to 14, wherein the connection line setting means sets a color tone of the connection line in accordance with the infection risk value.

(Supplementary Note 16)
A risk display method executed by a computer, the risk display method comprising:
acquiring image data from a camera;
identifying a plurality of persons from the image data;
measuring a distance between the persons;
setting an appearance of a connection line corresponding to each of the distances;
generating a person icon indicating the person based on the image data;
generating a risk image in which a plurality of the person icons are connected to each other through the connection lines; and
outputting risk image data of the risk image.

(Supplementary Note 17)
A non-transitory computer readable medium storing a program for causing a computer to execute an image processing method comprising:
acquiring image data from a camera;
identifying a plurality of persons from the image data;
measuring a distance between the persons;
setting an appearance of a connection line corresponding to each of the distances;
generating a person icon indicating the person based on the image data;
generating a risk image in which a plurality of the person icons are connected to each other through the connection lines; and
outputting risk image data of the risk image.

This application is based upon and claims the benefit of priority from Japanese patent application No. 2020-212393, filed on Dec. 22, 2020, the disclosure of which is incorporated herein in its entirety by reference.

REFERENCE SIGNS LIST

1 RISK DISPLAY SYSTEM
2 RISK DISPLAY SYSTEM
10 RISK DISPLAY APPARATUS
20 RISK DISPLAY APPARATUS
111 IMAGE DATA ACQUISITION UNIT
112 IDENTIFICATION UNIT
113 MEASUREMENT UNIT
114 CONNECTION LINE SETTING UNIT
115 PERSON ICON GENERATION UNIT
116 IMAGE GENERATION UNIT
117 OUTPUT UNIT
118 INFECTION RISK VALUE CALCULATION UNIT
119 LIP CONDITION DETECTION UNIT
200 DISPLAY
300 CAMERA
400 THERMAL CAMERA
500 COMPUTER
900 FACILITY
L12 CONNECTION LINE
L13 CONNECTION LINE
L14 CONNECTION LINE
N1 COMMUNICATION NETWORK
P1 FIRST PERSON
P2 SECOND PERSON
P3 THIRD PERSON
P4 FOURTH PERSON
P11 FIRST ICON
P21 SECOND ICON
P31 THIRD ICON
P41 FOURTH ICON
R11 RISK IMAGE
R21 RISK IMAGE
R22 RISK IMAGE
R31 RISK IMAGE

What is claimed is:

1. A risk display apparatus for controlling a graphical user interface to display a risk image, which shows risk of infection with a disease, by arranging a plurality of person icons connected by a plurality of connection lines, the risk display apparatus comprising:
at least one memory storing instructions; and
at least one processor configured to execute the instructions to:
receive digital image data from a camera;
perform convolution processing on the received digital image data to identify a plurality of persons from the digital image data and generate position information for each of the plurality of persons;
measure, using the generated position information for each of the plurality of persons, a distance between each of the plurality of persons;
determine an appearance, on the graphical user interface, of a connection line corresponding to each of the measured distances;
generate, based on the digital image data, for each of the plurality of persons, a person icon on the graphical user interface, the person icon indicating the respective one of the plurality of persons;
generate the risk image in which a plurality of the person icons are connected to each other through the connection lines; and
control the graphical user interface to display the risk image.

2. The risk display apparatus according to claim 1, wherein the at least one processor is further configured to execute the instructions to set a length of the connection line corresponding to the distance.

3. The risk display apparatus according to claim 2, wherein the length of the connection line set by the processor corresponds to an average value of the distances when the distance between two of the plurality of persons has become shorter than a predetermined threshold.

4. The risk display apparatus according to claim 1, wherein the at least one processor is further configured to execute the instructions to:
measure a time corresponding to the distance; and
set an appearance of the connection line corresponding to the distance and the time.

5. The risk display apparatus according to claim 4, wherein the at least one processor is further configured to execute the instructions to set a thickness of the connection line corresponding to the time.

6. The risk display apparatus according to claim 5, wherein the thickness of the connection line set by the processor corresponds to a cumulative value of the times when the distance between two of the plurality of persons has become shorter than a predetermined threshold.

7. The risk display apparatus according to claim 1, wherein the at least one processor is further configured to execute the instructions to:
select one of the person icons as a selection icon; and
place the person icons other than the selection icon near the selection icon.

8. The risk display apparatus according to claim 7, wherein the at least one processor is further configured to execute the instructions to, in a process in which one of the person icons is selected from among the other person icons, place the selected person icon as the selection icon.

9. The risk display apparatus according to claim 7, wherein the at least one processor is further configured to execute the instructions to:
measure a direction in which a face of each of the two of the plurality of persons is facing when the distance between the two of the plurality of persons has become shorter than a predetermined-threshold;
generate the person icons respectively including the faces of the two of the plurality of persons; and
place the person icons based on the respective directions in which the faces of the two of the plurality of persons are facing.

10. The risk display apparatus according to claim 9, wherein the at least one processor is further configured to execute the instructions to place the other person icons to be placed near the selection icon at an angle relative to a direction in which the face of the selection icon is facing.

11. The risk display apparatus according to claim 9, wherein the at least one processor is further configured to execute the instructions to place the other person icons to be placed near the selection icon so that a direction in which the face of each of the other person icons is facing is set at an angle relative to a direction in which the face of the selection icon is facing.

12. The risk display apparatus according to claim 1, wherein the at least one processor is further configured to execute the instructions to:
calculate an infection risk value based on at least the distance between the two of the plurality of persons; and
set the appearance of the connection line in accordance with the infection risk value.

13. The risk display apparatus according to claim 12, wherein the at least one processor is further configured to execute the instructions to:
detect a condition of lips of each of the plurality of persons;
take into account the condition of the lips; and
calculate the infection risk value.

14. The risk display apparatus according to claim 12, wherein the at least one processor is further configured to execute the instructions to:
acquire thermal image data from a thermal camera;
measure a body surface temperature of each of the plurality of persons based on the thermal image-data;
take into account the body surface temperature; and
calculate the infection risk value.

15. The risk display apparatus according to claim 1, wherein the at least one processor is further configured to execute the instructions to set a color tone of the connection line in accordance with the infection risk value.

16. A risk display method executed by a computer for controlling a graphical user interface to display a risk image, which shows risk of infection with a disease, by arranging a plurality of person icons connected by a plurality of connection lines, the, the risk display method comprising:
receiving digital image data from a camera;
performing convolution processing on the received digital image data to identify a plurality of persons from the digital image data and generate position information for each of the plurality of persons;
measuring, using the generated position information for each of the plurality of persons, a distance between each of the plurality of persons;
determine an appearance, on the graphical user interface, of a connection line corresponding to each of the measured distances;

generating, based on the digital image data, for each of the plurality of persons, a person icon on the graphical user interface, the person icon indicating the respective one of the plurality of persons;

generating the risk image in which a plurality of the person icons are connected to each other through the connection lines; and controlling the graphical user interface to display the risk image.

17. A non-transitory computer readable medium storing a program for causing a computer to execute a risk display method for controlling a graphical user interface to display a risk image, which shows risk of infection with a disease, by arranging a plurality of person icons connected by a plurality of connection lines, the risk display method comprising:

receiving digital image data from a camera;

performing convolution processing on the received digital image data to identify a plurality of persons from the digital image data and generate position information for each of the plurality of persons;

measuring, using the generated position information for each of the plurality of persons, a distance between the plurality of persons;

determining an appearance, on the graphical user interface, of a connection line corresponding to each of the measured distances;

generating, based on the digital image data, for each of the plurality of persons, a person icon on the graphical user interface, the person icon indicating the respective one of the plurality of persons;

generating the risk image in which a plurality of the person icons are connected to each other through the connection lines; and controlling the graphical user interface to display the risk image.

* * * * *